May 12, 1970 J. H. ABLER 3,511,256

FLUID LOGIC ELEMENT

Filed March 6, 1968 4 Sheets-Sheet 1

INVENTOR.
JOSEPH H. ABLER
BY Bair, Freeman & Molinare
ATTORNEYS

May 12, 1970 J. H. ABLER 3,511,256

FLUID LOGIC ELEMENT

Filed March 6, 1968 4 Sheets-Sheet 2

INVENTOR.

JOSEPH H. ABLER

BY Baer, Freeman & Molinare

ATTORNEYS

FLUID LOGIC ELEMENT

Filed March 6, 1968 4 Sheets-Sheet 3

INVENTOR.
JOSEPH ABLER
BY Bair, Freeman & Molinare
ATTORNEYS

INVENTOR.
JOSEPH H. ABLER
BY Bair, Freeman & Molinare
ATTORNEYS 3,511,256
FLUID LOGIC ELEMENT
Joseph H. Abler, Cleveland, Ohio, assignor to Aro Corporation, a corporation of Delaware
Continuation-in-part of application Ser. No. 627,463, Mar. 31, 1967. This application Mar. 6, 1968, Ser. No. 711,010
Int. Cl. F15c *1/02*
U.S. Cl. 137—81.5 14 Claims

ABSTRACT OF THE DISCLOSURE

A fluidic NOR amplifier utilizing momentum control. A power stream fluid input passes into a chamber and out through an outlet port substantially opposite the input port. Fluid control signals may pass through any of three control ports normal to the power stream and impinge directly on the power stream to cause switching to a second outlet port. Four vent ports are arranged at various positions in the chamber to promote switching and insure uniform response to control pulses. The NOR amplifier may also be combined with a NOT device to provide an OR output.

CROSS REFERENCE TO RELATED APPLICATIONS

This is a continuation-in-part of application Ser. No. 627,463, Fluid Logic Element by Abler, filed Mar. 31, 1967, now abandoned.

The amplifier (NOR) element of this application may be incorporated in a Semi-Integrated Fluid Logic System of the type disclosed by Kautz et al. Ser. No. 622,122, filed Mar. 10, 1967. The NOR element may also be combined and utilized with the R.S. element disclosed by Abler, Ser. No. 627,463, filed Mar. 31, 1967.

BACKGROUND OF THE INVENTION

This invention relates to a fluid circuit device and more particularly a fluid circuit amplificaton element.

One of the most recent areas of technological innovation concerns the use of fluids, such as air, in a network or circuit of conduits, chambers and valves to perform switching and other logic operations. The flow of fluids through conduits in a fluidic circuit is analogous to the passage of electrons through wires in an electrical circuit and, by controlling and amplifying the flow of fluids just as electron flow is controlled and amplified in electronic circuits, it has been possible to supplement and even replace some electronic devices. Both compressible fluids (such as air) and relatively incompressible fluids (such as water) will perform suitably in fluidic devices. Because fluidic devices are substantially unaffected by temperature extremes, radiation, vibration or shock (conditions that often damage or render ineffective electronic circuits), these devices are currently being investigated for a number of uses including aerospace and military applications.

Fluidic devices are energized by the introduction of a continuous stream of fluid, usually air, into the power input channel of the device. For example, a constant pressure power input fluid flow is fed into the base leg of a Y-shaped channel. As the power input stream flows toward the port outlets at the end of the two diverging arms of the Y, a fluid flow phenomenon, called the "Coanda effect," causes the stream to attach itself to one side of the channel and flow out through only one of the arms. A control jet of fluid impinging at an angle against the power stream as it passes can force the power stream to attach itself to the opposite side of the channel. A pulse of fluid from a second control jet which opposes the first control jet can reverse the sequence.

By moving the control jet down the base leg of the Y away from the vertex, and by enlarging the channel around the vertex of the Y to form a chamber, one can eliminate the Coanda, "wall attachment," effect. Now, by changing the control jet pressure, it is possible to proportionally vary the amount of fluid passing through a selected outlet arm of the Y-shaped channel. Control pulses of greater pressure will cause proportionally more fluid to pass through one arm of the Y.

Generally, then, there are two methods of switching or controlling the flow of the power stream in a fluidic device; namely, (1) by momentum interaction between the control stream and the power stream and (2) by a boundary layer action in which fluid is trapped in a boundary area or space between the power stream and a wall of the fluidic device (Coanda effect). Fluid in the trapped area is at a relatively lower pressure than the power stream and tends to draw the power stream toward the wall. To deflect the power stream, fluid from a control port is injected into this low pressure area, raising its pressure, and forcing the power stream away from the wall.

A type of fluid amplifier useful for the creation of complex fluidic circuits is the NOR gate. This is a two position fluidic device rather than a proportional device. Using the principles of NOR logic, a number of such devices may be combined to form a useful complex fluidic circuit. The characteristics of any complex circuit are dependent, in a large measure, upon the characteristics of the devices comprising the circuit. A NOR device ideally has quick response to a control flow, is operable and accurate over a wide range of pressures, has a high ratio of pressure output to pressure input, and responds to relatively low control pressures.

Another useful fluidic device is the NOT device. When a NOR is combined with a NOT it is possible to form an OR gate.

SUMMARY OF THE INVENTION

In a principal aspect the present invention takes the form of an improved fluidic amplifier and more particularly, an improved fluidic NOR gate. Accordingly, the central chamber of the amplifier which interconnects the fluid ports has a substantially straight line side wall. Contiguous with the side wall at opposite ends of the chamber is an inlet port and a first outlet port. Fluid introduced into the chamber through the inlet port, absent any control port fluid flow, follows a substantially straight line path along the side wall and exits through the first outlet port. Adjacent and spaced from the first outlet port is a second outlet port. A plurality of control ports are positioned in the side wall so that fluid injected into the chamber through any of them flows substantially normal to the side wall. Fluid flow through any of the control ports impinges directly on the inlet fluid flow along the side wall causing the inlet stream to bend and exit through the second outlet port.

The NOR gate of the invention is also combined with a NOT device to provide an OR gate. The NOR-NOT elements are preferably defined as separate subelements on the same element with walls interrupting the passages between the subelements, the walls being of the type that may be easily broken away to provide interconnection between the subelements.

It is thus an object of the present invention to provide a fluid amplifier device responsive to any of a plurality of fluid control pulses.

It is a further object of the present invention to provide a fluid amplification device which eliminates substantially the interaction between control port inlet pulses.

A further object of the present invention is to provide a fluid amplification device adaptable to modular construction.

Still another object of the present invention is to provide a fluid amplification device having quick response times to control pulses.

Another object of the present invention is to provide a fluid amplification device useful over a wide range of pressures.

A further object of the present invention is to provide a fluidic device having OR gate and NOR gate capability.

Another object is to provide a fluid amplifier which requires a relatively low control pressure to effect switching.

One further object is to provide a fluid amplifier which requires a relatively low control pressure to effect switching.

Another object is to provide NOR-NOT elements which may be easily adapted to interconnect and provide an OR gate.

These and other objects, features and advantages may be more readily understood by the detailed description which follows.

DESCRIPTION OF THE PREFERRED EMBODIMENT

Figures 1, 3:
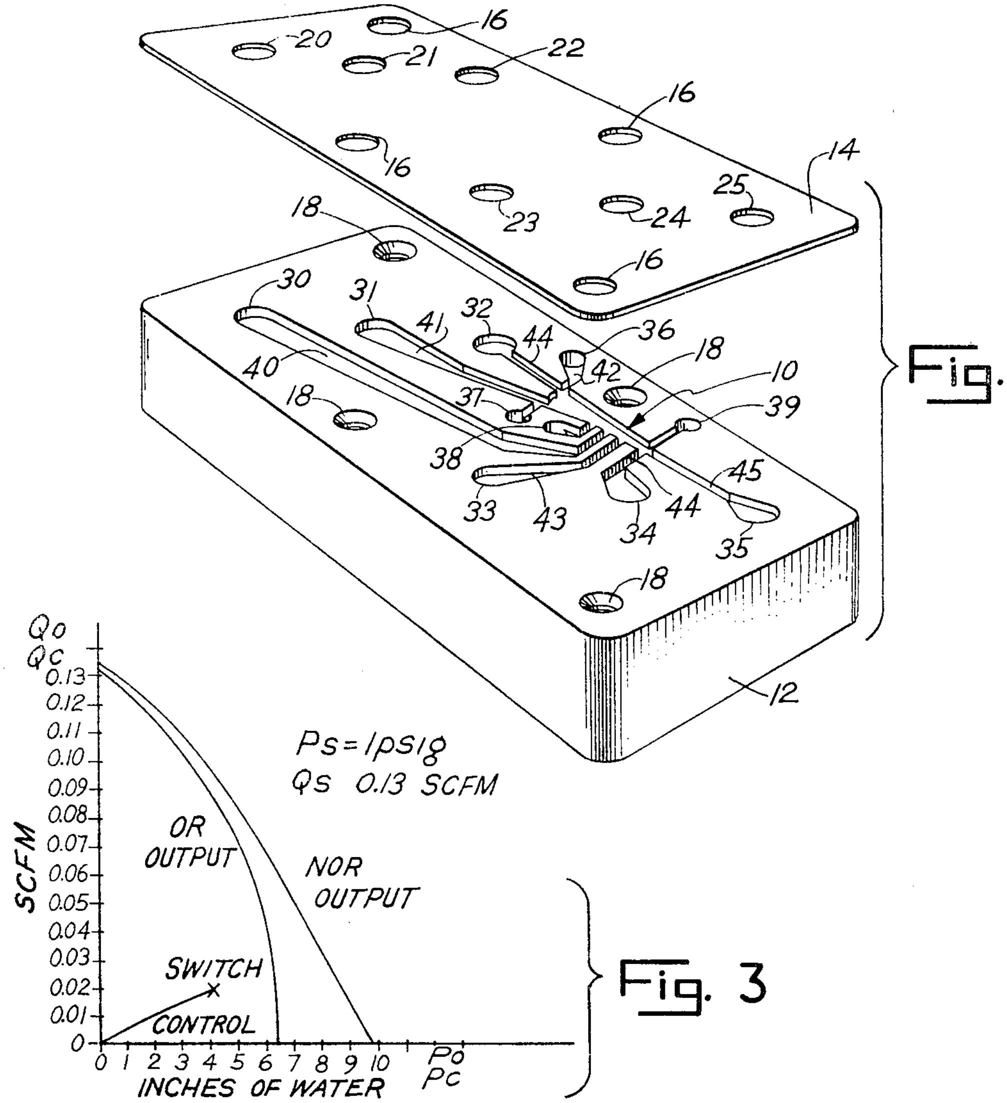
FIG. 1 is an exploded perspective view of the fluid circuit amplification element and its cover plate.
FIG. 3 is a graph of fluid volume output versus fluid pressure output at constant input pressure for the amplifier.

The device and its characteristics shown in FIGS. 1 through 4 is a pure fluid amplifier which accepts fluid control signals and produces logic outputs based on the control signals. It is essentially a NOR gate. In FIG. 1 the amplifier, formed by a system of interconnecting passageways generally shown at 10, is defined by the block 12 and cover plate 14 which mates with the block 12. The cover plate 14 is attached to the block 12 by fastening means (not shown) passing through the fastening holes 16 in the cover plate 14 and fastening holes 18 in the block 12. There are six spaced openings 20 through 25 in the cover plate which, when the cover plate 14 and the block 12 are mated, are positioned over the enlargements 30 through 35. The enlargements 30 through 35 are connected to the fluid nozzles 40 through 45 respectively.

The enlargements 30 through 35 may be modularly spaced and the block 12 is modularly constructed so that the fluid amplifier may be incorporated in the Semi-Integrated Fluidic Logic System disclosed in the copending application Ser. No. 622,122, filed on Mar. 10, 1967, by Kautz et al.

When being operated, the block 12 and plate 14 are mated and external fluid conduits are connected to the several openings 20 through 25 in the plate 14. A fluid flow pressure supply is fed through the supply opening 25. Control flows are fed through the control openings 20, 23 and 24. Outlet flows may be sensed through one or the other of the outlet openings 21 or 22. Vent enlargements 36 through 39 are extensions of holes through block 12 and connect with the atmosphere.

Figure 2:
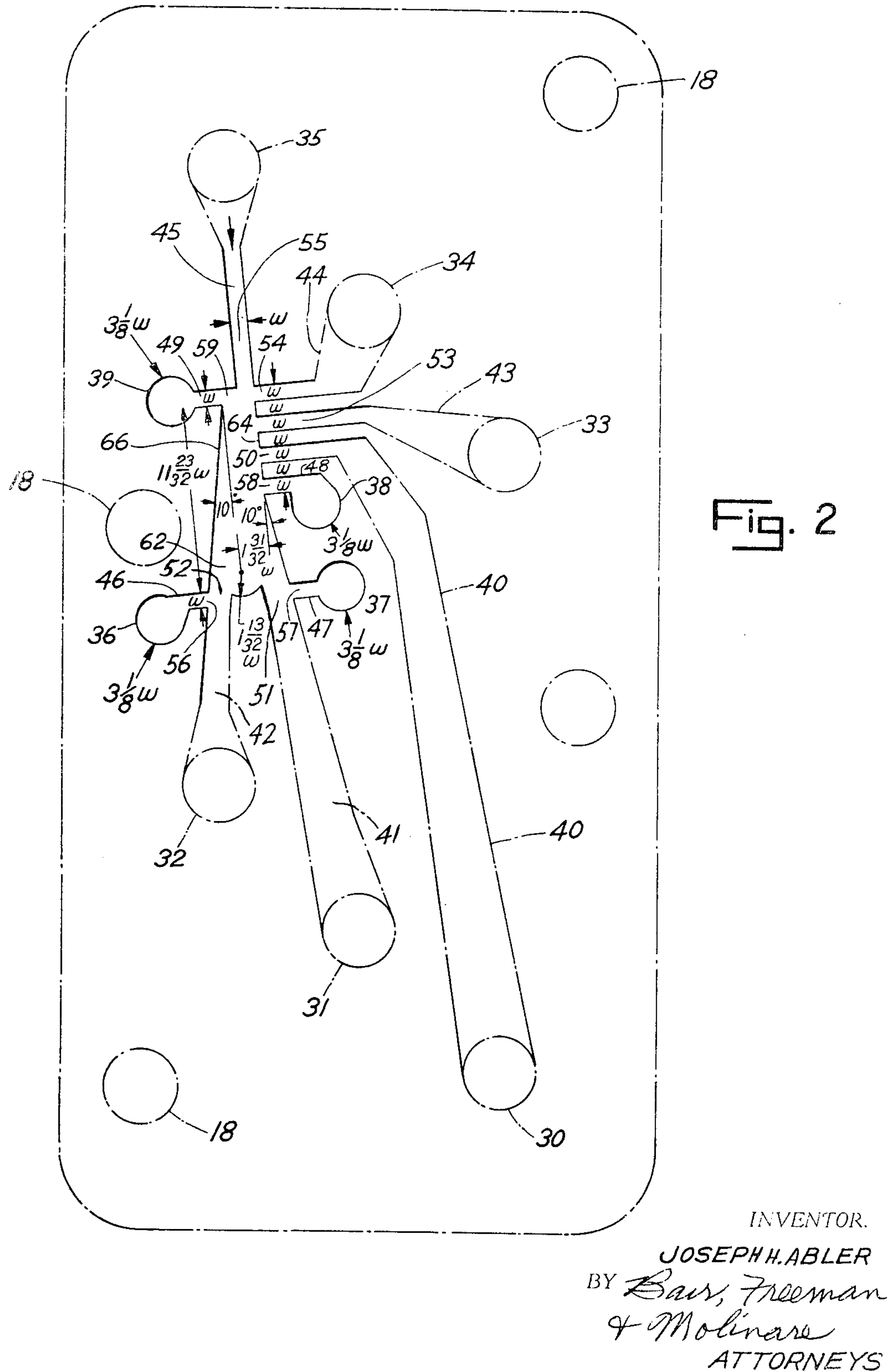
FIG. 2 is a plan view of the fluidic amplifier.

The operation of the device may perhaps be best explained by referring to the plan view of FIG. 2. A jet of fluid, injected through the input enlargement 35, flows through the input nozzle 45 in the direction of the arrow and into the chamber 62 through the input port 55. When there are no control flows impinging on the input stream, the inlet jet of fluid travels through the chamber 62 in a relatively straight line path along the lower wall 64 and exits through the outlet port 51. Thereafter the fluid flows through the nozzle 41 and out the outlet enlargement 31. The outlet enlargement 31 in combination with the nozzle 41 and port 51 is generally termed the NOR gate or NOR side of the amplifier.

Any of three ports 50, 53 and 54 located along the lower wall 64 of the chamber 62 may be supplied with a control signal fluid flow through the nozzles 40, 43 and 44 respectively. If any or all of these three ports 50, 53 and 54 are provided with sufficient flow, the jet issuing from the input port 55 is deflected or switched to the opposite or top wall 66 of the chamber 62. The main supply jet then exits through the port 52, flows through the nozzle 42 and out through the outlet enlargement 32. The outlet enlargement 32 in combination with the nozzle 42 and port 52 is generally termed the OR gate or OR side of the amplifier.

The lower wall 64 of the chamber 62 is a substantially straight line continuation of the lower wall of the input nozzle 45 with the port 55 and lower wall 64 contiguous. This construction contrasts with most conventional fluidic NOR devices which have an offset wall and utilize the Coanda or wall attachment effect.

A Coanda type device is switched when fluid from a control port fills the low pressure region adjacent the power stream. As a result, the quality of response to a control signal in a Coanda device depends upon the position of the control port in relation to the low pressure region. The fluidic device of the present invention eliminates the offset wall thereby substantially eliminating the low pressure region. Switching is effected by direct momentum interaction between a fluid jet through one of the control ports 50, 53 or 54 and the fluid jet through the inlet port 55. Response times to control pulses are shorter; furthermore, the response times are substantially equal regardless of the position of the control ports 50, 53 and 54 in relation to the inlet port 55.

Another advantage of utilizing momentum interaction is that hysteresis is substantially eliminated in the control pressure-output pressure relationship. In other words there is a less significant time lag between the control input impulse and the switching of the output stream.

The upper wall 66 of the chamber 62 is offset from the input port 55 to provide a low pressure region which assists in holding the input power stream jet to the upper wall 66 region of the chamber 62 while control flows issue from the ports 50, 53 and/or 54.

The first vent port 59 in the upper wall 66 of the chamber 62 is connected to the atmosphere through the nozzle 49 and enlargement 39. The vent 59 allows fluid to escape from the chamber 62. Thus the fluid in the region of the upper wall 66 adjacent the vent 59 does not exert a back pressure when being displaced by a deflected inlet power stream. This assures a quick response and deflection of the inlet power stream during a control pulse.

If the first vent port 59 is blocked, the inlet power jet, due to the Coanda or wall attachment effect, seeks attachment to the offset upper wall 66. Thus failure to provide the vent 59 severely inhibits OR gate to NOR gate switching. On the other hand, blocking the vent port 59 produces the same result as control pulse flow from the ports 50, 53 and/or 54; namely, switching the inlet power stream from the NOR gate to the OR gate.

Located at the downstream side of the chamber 62 are second and third vent ports 57 and 56 respectively, connected to enlargements 37 and 36 respectively, by nozzles 47 and 46 respectively. The second and third vent ports 57 and 56 provide a path to atmosphere for the main jet should either ports 51 or 52 be blocked or severely restricted during operation. These vent ports 57 and 56 thus permit the amplifier to operate into a blocked load.

Likewise, a fourth vent port 58 connected to the enlargement 38 by the nozzle 48 provides a vent to the atmosphere when either of the outlet ports 51 or 52 are blocked. Vent port 58 also prevents the main input jet from attaching to the lower wall 64 below the control port 50. Without the vent 58 a larger flow of control fluid is required through the control port 50 into the chamber 62 to effect switching than is required through the other two ports 53 and 54. Thus, the vent 58 balances the three input signal levels required to switch the amplifier.

The amplifier provides a NOR side output signal whenever there are no control signals. When there are any of three control signals through ports 50, 53 and/or 54 the amplifier provides a second or OR side output. It is possible to use the amplifier for not only an OR or NOR gate, but also combine the OR-NOR gate with other OR-NOR gates to form the AND, NAND, and NOT functions.

The inlet control nozzles 40, 43 and 44 are equidimensional at the ports 50, 53 and 54 respectively and are separated by at least one inlet port 55 width W along the lower wall 64 of the chamber 62. Thus flow from any of these ports 50, 53 and/or 54 has minimal interaction effect on the other adjacent ports 50, 53 and/or 54.

All the nozzles and ports are limited to a minimum width W which is the width of the input port 55. The depth of the nozzles is 1.6 times this nominal width W. Likewise, the depth of the device is uniform and is 1.6 W. Also, all parallel nozzles such as the control nozzles 40, 43 and 44 are at least one nominal width W apart. This permits the element to be manufactured by conventional die casting or injection molding methods. Preferably all the control input and vent ports are the nominal width W. The outlet ports are generally greater than W. The walls of the device are preferably perpendicular to one another to simplify mathematical analysis and fabrication by molding or casting.

A cusp 68 separates the outlet ports 51 and 52. The cusp 68 assists switching by causing the power stream to flow against the upper wall 66 or the lower wall 64.

Test results using an amplifier of this design with W equal to 0.0315″ at an input supply pressure ($P_s$) of one p.s.i.g. and a constant input flow rate ($Q_s$) of 0.13 standard cubic feet per minute (s.c.f.m.) are shown in FIG. 3 where the flow output ($Q_o$) versus the pressure output ($P_o$) is plotted. Also shown in FIG. 3 for the same input supply ($Q_s$) and pressure ($P_s$), is the plot of control flow rate ($Q_c$) versus control pressure ($P_c$). Approximately 4 inches of water are required to switch the element. At 4 inches of output pressure on the NOR side, a sufficient flow (0.1 s.c.f.m.) is recovered to switch four or five elements (0.02 s.c.f.m. each). Interconnecting lines of high restriction between several elements can lower the number of possible elements which are controlled by the output from the one element. However, if one OR side is run into four control ports simultaneously, the output pressure normally will settle to about 4 inches of water which is sufficient to activate four elements. Since the NOR side has better pressure recovery, it will be more reliable at controlling other elements than the OR side of the amplifier.

Figure 4:
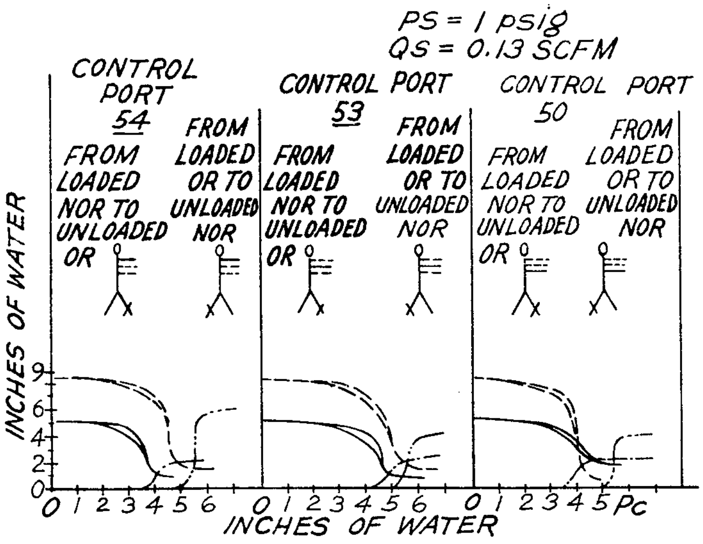
FIG. 4 is a graph of output pressure versus switching pressure under various conditions for the amplifier.

In FIG. 4 the output pressure ($P_o$) is plotted against the control pressure ($P_c$) for each of the control ports 50, 53 and 54. As diagramatically shown, restriction is first placed on the NOR output port and pressure at that port is recorded as control pressure is increased with the OR side open. When the output suddenly drops switching has occurred. Switching from the loaded or blocked OR side is also graphed for each control port 50, 53 and 54.

Control pressure was increased then reduced back to zero. The very small difference in the increasing and decreasing control pressure curves shows the lack of hysteresis and quick response. The graph also shows the results of two different sized load restrictions on the NOR side. When there is a lower restriction on the NOR side, switching occurs at a lower control pressure than with the high restriction. Thus the control pressure required to switch increases proportionally with the output loading.

The OR side was also restricted and OR output pressure ($P_o$) recorded versus control pressure ($P_c$) with the NOR side being open. The control pressure ($P_c$) also increased with loading in these circumstances as can be seen on the graph in FIG. 4.

Some of the characteristics of this OR-NOR amplifier are as follows: (1) The number of elements which can be controlled by an output from the amplifier is about four. (2) The NOR output pressure is slightly higher and thus more efficient than the OR output pressure for the same size load. (3) Control pressure required to switch increases with increasing loads. (4) The switching time at 1 p.s.i.g. is about 0.001 second. (5) At supply pressures above 3 p.s.i.g. the amplifier is incapable of driving a blocked load. (6) Finally the element will opearte at supply pressures up to 50 p.s.i.g.; however, for best operation supply pressure should be less than 25 p.s.i.g.

Figure 5:
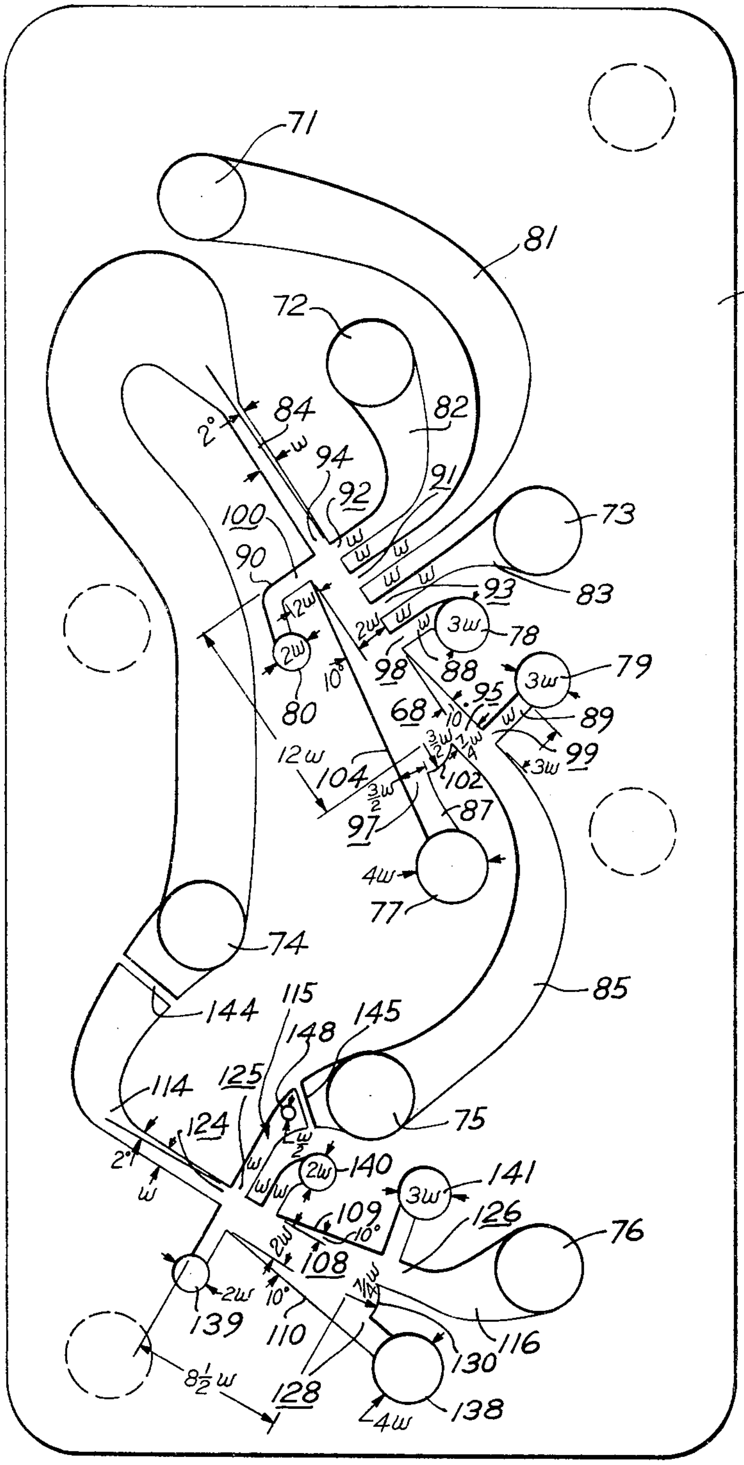
FIG. 5 is a plan view of the combined fluidic amplifier and NOT device.

FIG. 5 illustrates a NOR device combined with a NOT device, both devices being defined in the same modular element, to provide an OR response in addition to the NOR response of the NOR device. Referring now to FIG. 5, there is shown in a modular block 70 of the type previously described as block 12, a NOR element and a NOT element. Enlargements 71, 72 and 73 connect by way of nozzles 81, 82 and 83 to ports 91, 92 and 93. Ports 91, 92 and 93 are control ports leading into chamber 68 of the NOR device.

Fluid passing through the control ports 91, 92 or 93 impinges on fluid passing from enlargement 74 through nozzle 84 and by way of inlet port 94 into chamber 68. Fluid flow through any of the inlet ports 91, 92 and 93 will affect fluid passing through inlet port 94 by momentum interaction to cause this fluid to exit through outlet port 97 through nozzle 87 and out through vent 77. On the other hand, if there are no control signals through the control ports, the inlet flow exits through outlet port 95, nozzle 85 and out through enlargement 75 to provide a NOR response. Cusp 100 serves as a flow guide to insure that flow exits through either outlet port 95 or 97 but never through both simultaneously.

Vent 78 connected through nozzle 88 and port 98 insures maintenance of ambient pressure in chamber 68 downstream from control ports 91 through 93. Vent 78 also facilitates switching characteristics of each of the control ports 91 through 93 and prevents hysteresis in the switching operation due to Coanda wall attachment downstream from port 93.

Vent 79 connected by nozzle 89 to port 99 provides an alternate exit for the NOR output flow signal flowing into nozzle 85 in the event enlargement 75 becomes restricted.

Vent 80 connected by nozzle 90 to port 100 provides a fluid bleed which prevents the input power flow from attaching to wall 104 of chamber 68 due to the Coanda effect.

Thus it can be seen that the NOR element in block 70 is substantially the same as previously described except that there is no OR output alternative to the NOR output since the vent is not positioned to one of the modular ouput connection enlargements 71 through 76. A further feature of the NOR device illustrated in FIG. 5 is the offset of the input nozzle 84 at about 2° from the straight line sidewall of the chamber 68 through which the input ports 91, 92 and 93 are defined. This design feature, which differs slightly from that previously described for the embodiment illustrated in FIGS. 1 and 2, allows the expansion of fluid through the supply port 94 without forcing flow into the control ports 91, 92 and 93. This also insures mantenance of an ambient pressure in the control ports 91, 92 and 93 when they are vented to the atmosphere.

The block 70 also includes a NOT element. The NOT element includes a central chamber 108 having an upper wall 109 and a lower wall 110. Power input flow passes through the enlargement 74 into the nozzle 114 and through the port 124 into chamber 108. A control stream may pass through enlargement 75 into nozzle 115 through port 125 to impinge on the power input stream.

When the power input stream is not impinged upon, it passes through the chamber 108 along the wall 109 and out through port 126 and nozzle 116 to enlargement 76 where it is directed to another fluidic device or the like by external means (not shown).

When, however, fluid does impinge upon the power input stream from port 124, the output is directed along wall 110 of chamber 108 and out through port 128 and vent 138 to the atmosphere. Cusp 130 serves as a flow guide to insure that fluid flow exits through either outlet port but never both simultaneously. Vent 139 provides a flow bleed and thus prevents any flow through the input port 124 from attaching to the wall 110 due to the Coanda effect. Vent 140 insures that an ambient pressure in chamber 108 is maintained downstream from control port 125.

Vent 140 enables the fluid passing through the supply port 124 to be switched more easily and it also prevents hysteresis in the switching operation which may occur due to the Coanda effect downstream from control nozzle 125. Vent 141 provides an alternate exit for the OR output flow signal should the flow through the outlet port 126 or the enlargement 76 become restricted. This prevents switchover to outlet port 128 in the absence of a control signal through control port 125.

Provided in the nozzle passageways 114 and 115 leading from enlargements 74 and 75 respectively are walled partitions 144 and 145. To utilize only the NOR device these partitions are maintained as shown in FIG. 5. However, to use the NOR-NOT combination of fluidic elements these partitions are broken away to provide clear nozzle passageways 114 and 115.

When these partitions 144 and 145 are broken away the principle of operation is as follows:

If any control flow signals through ports 91, 92 or 93 are present then the power input supply through port 94 is deflected toward wall 104 and out through vent 77. In such a case power input through the port 124 of the NOT device flow through chamber 108 along wall 109 and out through outlet port 126 to provide a measurable response through enlargement 76. Termination of all control flow signals through ports 91, 92 and 93 results in an output through outlet port 95 which passes through nozzle 85 and control nozzle 115 of the NOT device and finally out through NOT control port 125 to impinge upon the input stream through port 124. This, in turn, deflects the output through port 128 and vent 138.

If the control signals through ports 91, 92 or 93 are weak, it is possible that a flow through nozzle 85 will not be shut off completely. This slight leakage could be sufficient to terminate the output flow through outlet port 126 of the NOT device. For this reason vent 148 is provided to bleed off any leakage flow from the NOR sub element.

Thus it can be seen that the element illustrated in FIG. 5 contains two integrated sub elements, a three input NOR device coupled to a one input NOT. This combination produces a three input NOR plus an OR device. The resulting NOR and OR output signals are decoupled since each originates from a different supply jet. This is an important factor if both the NOR and the OR are loaded.

As shown in FIG. 5, the desired dimensions of the fluidic device are indicated with their relationship being dependent upon the standard minimum width, W, of inlet port 94. The depth of all channels is about 1.6 times this nominal width. As previously described for the device illustrated in FIGS. 1 and 2, the control ports are separated by at least one nominal width, W, along the wall of the chamber so that flow from any of these ports has minimal effect on the other ports. Moreover, this permits the element to be manufactured by conventional die casting or injection molding methods.

The device is a momentum interaction device which eliminates the separation bubble and time lag commonly found in Coanda type devices. Hysteresis therefore is not present in the control pressure output pressure relationship. Since this is a momentum interaction type device, the flow pressure characteristics of the control ports are not dependent upon the position of the input supply jet.

FIG. 5 illustrates the preferred arrangement of the NOR and NOT devices. The dotted openings are used for fastening the cover plate as was previously described for the NOR device of FIGS. 1 and 2; however, not only may external connections be made through a cover plate as at 14 in FIG. 1, but also they may be made through enlargements as at 70 in FIG. 5 which pass completely through block 70. A plate (not shown) would in this latter case merely seal the device from the atmosphere. Thus, the important features of the invention are shown by FIGS. 2 and 5 in plan cross section especially in the vicinity of the central interaction chambers. This is best illustrated by FIG. 2 which illustrates the more important features of the NOR-OR device in solid lines. Since FIG. 5 illustrates a NOR-NOT combination, the entire device is shown in solid lines, although changes in the shape of the interconnecting nozzles as at 85 may be effected without adversely affecting the characteristics of the device. The configuration illustrated is merely necessitated by the modular arrangement of the NOR-NOT device in the block 70.

Figure 6:
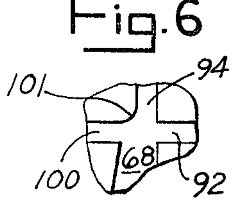
FIG. 6 is a plan view of that section of the amplifier adjacent the fluid input port.

FIG. 6 is an enlarged view of the region of the inlet port 94. The following comments are equally applicable to the region of the inlet port 124 of the NOT device. Preferably the corner 101 adjacent the inlet port 94 is slightly rounded as shown in FIG. 6. This is to insure that the control flow from the ports 91, 92 and 93 will produce a substantially identical deflection in the fluid flow through the input port 94. Corner 101 should only be slightly rounded since the more this corner is rounded, the less control flow passing through port 91 is required to switch the supply jet. Thus rounding this corner too much will result in unequal control flows being required through the ports 91, 92 and 93. Failing to round corner 101 will likewise result in unequal control flows.

Figure 7:
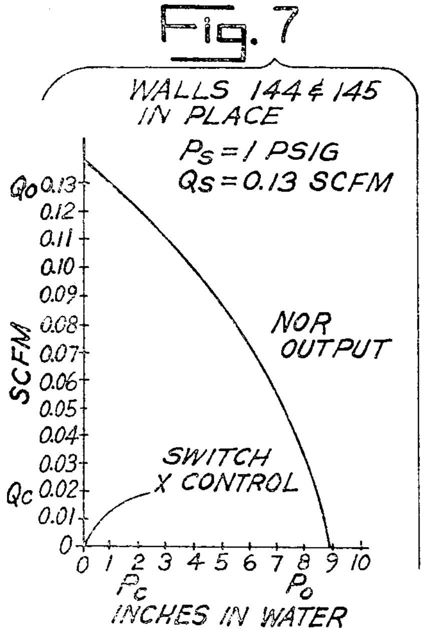
FIG. 7 is a graph of fluid volume output versus fluid pressure output at constant input pressure for the NOR device without being connected to the NOT device.
Figure 8:
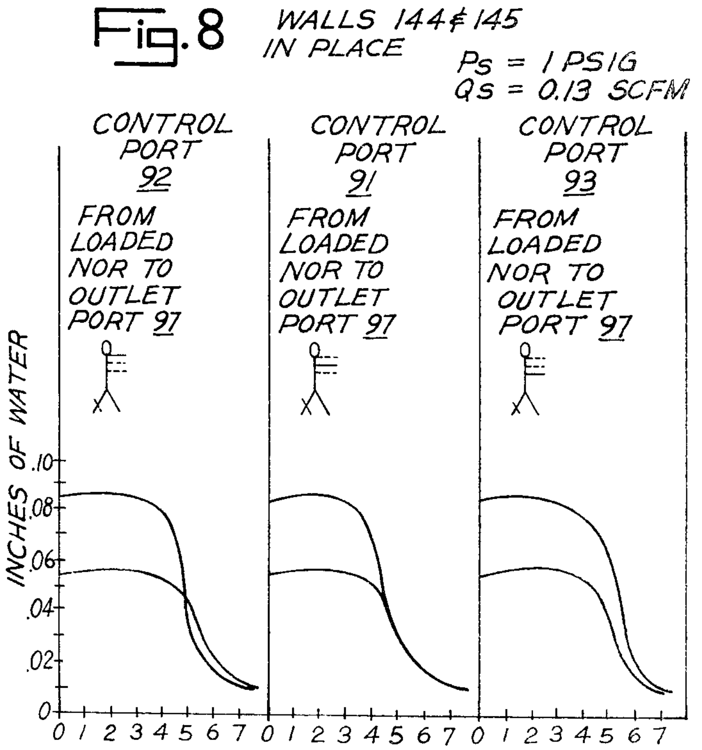
FIG. 8 is a graph of output pressure versus switching pressure for the various control ports of the NOR device when not connected to the NOT device; and illustrates the switching characteristics of this device.
Figure 9:
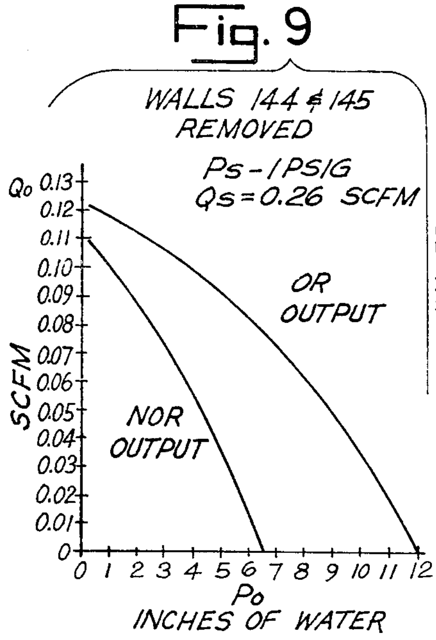
FIG. 9 is a graph of fluid volume output versus fluid pressure output at constant input pressure for the connected NOR-NOT device.
Figure 10:
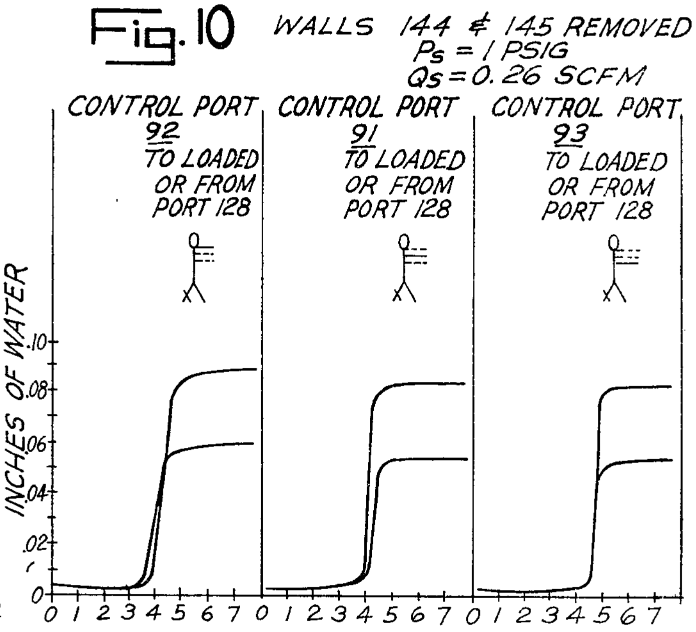
FIG. 10 is a graph of output pressure versus switching pressure for the control ports of the NOR device when the NOR and NOT devices are interconnected and illustrates the switching characteristics of this device.

FIGS. 7 and 8 are graphs of response data for the NOR device with walls 144 and 145 in place. FIGS. 9 and 10 are similar graphs for the combination NOR-NOT device with walls 144 and 145 removed. These graphs use the same notation as previously described for FIGS. 3 and 4, and demonstrate the loading and switching characteristics of the devices.

The useful fanout or number of devices which may be used at the output enlargement 75 and 76 of the element may be summarized as follows: (1) through NOR outlet enlargement 75 with partition 145 in place, four elements may be driven or loaded thereon, (2) through NOR output enlargement 75 with wall 145 removed, two elements may be driven plus the NOT device, and (3) through the OR output enlargement 76, four elements or devices may be driven.

While in the foregoing there has been disclosed a preferred embodiment of the present invention, it is to be understood that all equivalents and all embodiments obvious to those skilled in the art are included within the scope of the claimed invention.

What is claimed is:

1. A fluid amplifier comprising, in combination, (a) a chamber having a first substantially straight line side wall, (b) a first outlet port spaced from a second outlet port, said first and said second outlet ports providing exits from said chamber, said first outlet port providing a smooth continuous surface with said straight line side wall of said chamber, (c) an inlet port positioned to provide a smooth continuous surface joining to said straight line side wall for injecting fluid into said chamber in a substantially straight line flow along said side wall and exiting through said first outlet port, (d) at least one control port in said side wall for injecting a control fluid flow substantially normal to said side wall said control fluid directly impinging on said straight line fluid flow to switch said straight line fluid flow from exiting through said first outlet port to exit through said second outlet port, and (e) a vent port in said straight line side wall connected to said chamber and positioned substantially normal to said wall adjacent and downstream said control port.

2. The fluid amplifier of claim 1 including at least two control ports in said straight line side wall between said inlet port and said vent port.

3. The fluid amplifier of claim 2 wherein said control ports are separated from one another by a distance at least equal to the width of said power stream input port.

4. The fluid amplifier of claim 1 including a vent port connected to said chamber substantially normal to a second chamber side wall and substantially adjacent said power stream inlet port, said second side wall being substantially parallel to said first wall and being offset from said inlet port.

5. The fluid amplifier of claim 1 including a vent port downstream said vent port adjacent said control port connected to said chamber and positioned substantially adjacent and perpendicular to said first output port.

6. The fluid amplifier of claim 1 including a vent port connected to said chamber and positioned substantially adjacent and perpendicular to said second output port.

7. The fluid amplifier of claim 1 wherein said ports are defined by walls extending at substantially right angles to one another and the ratio of the depth of the amplifier to the width of said power stream input port is 1.6 to 1.

8. The fluid amplifier of claim 1 wherein said control ports have the same cross-sectional dimensions as said power stream input port.

9. The fluid amplifier of claim 1 wherein said vent and control ports have the same cross-sectional dimensions as said power stream input port.

10. The fluid amplifier of claim 1 including a NOT device, said NOT device comprising, in combination, a power input port, an outlet port, and a control port adapted to direct fluid against fluid passing through said power inlet to thereby switch said fluid flow from said outlet port, said control port also adopted to receive fluid from one of said fluid amplifier outlet ports.

11. The fluid amplifier and NOT device of claim 10 wherein said amplifier and NOT device comprise subelements of a single fluidic element, said subelements having at least one passageway interconnecting one part of each subelement, said passageway including a removable wall blocking said passageway.

12. The fluid amplifier and NOT device of claim 10 wherein said NOT device is a momentum interaction type fluid device.

13. The fluid amplifier and NOT device of claim 10 wherein said amplifier and NOT device comprise subelements of a modular fluidic element, said subelements having inlet and ports connected to modularly positioned external connections.

14. The fluid amplifier of claim 1 wherein said inlet port includes a curved corner opposite said straight line side wall, said corner being defined at the junction of said chamber and said inlet port.

References Cited

UNITED STATES PATENTS

| | | | |
|---|---|---|---|
| 3,107,850 | 10/1963 | Warren et al. | 137—81.5 XR |
| 3,171,421 | 3/1965 | Joesting | 137—81.5 |
| 3,174,497 | 3/1965 | Somers | 137—81.5 |
| 3,186,422 | 6/1965 | Boothe | 137—81.5 |
| 3,270,758 | 9/1966 | Bauer | 137—81.5 |
| 3,275,013 | 9/1966 | Colston | 137—81.5 |
| 3,339,569 | 9/1967 | Bauer et al. | 137—81.5 |
| 3,340,885 | 9/1967 | Bauer | 137—81.5 |

SAMUEL SCOTT, Primary Examiner